US010715237B1

(12) United States Patent
Landis et al.

(10) Patent No.: US 10,715,237 B1
(45) Date of Patent: Jul. 14, 2020

(54) ANTENNA AND BEAM SELECTION USING CSI FOR CHANNEL STATE FEEDBACK RATHER THAN CSI FOR BEAM MANAGEMENT

(71) Applicant: QUALCOMM Incorporated, San Diego, CA (US)

(72) Inventors: Shay Landis, Hod Hasharon (IL); Igor Gutman, Ramat Gan (IL); Ran Berliner, Kfar-Aviv (IL); Gideon Shlomo Kutz, Ramat Hasharon (IL); Assaf Touboul, Netanya (IL)

(73) Assignee: QUALCOMM Incorporated, San Deigo, CA (US)

( * ) Notice: Subject to any disclaimer, the term of this patent is extended or adjusted under 35 U.S.C. 154(b) by 0 days.

(21) Appl. No.: 16/590,090

(22) Filed: Oct. 1, 2019

(51) Int. Cl.
*H04B 7/06* (2006.01)
*H04W 24/08* (2009.01)
*H04B 17/318* (2015.01)
*H04L 5/00* (2006.01)

(52) U.S. Cl.
CPC ......... *H04B 7/0617* (2013.01); *H04B 7/0626* (2013.01); *H04B 17/318* (2015.01); *H04L 5/0048* (2013.01); *H04W 24/08* (2013.01)

(58) Field of Classification Search
CPC .................................................. H04B 7/0617
See application file for complete search history.

(56) References Cited

U.S. PATENT DOCUMENTS

2014/0098689 A1* 4/2014 Lee ...................... H04B 7/0639
370/252
2018/0269947 A1* 9/2018 Levitsky .............. H04B 7/0695
2018/0323825 A1* 11/2018 Cioffi ................... H04B 7/0634
2018/0324815 A1* 11/2018 Nammi ............. H04W 72/0413
2019/0058519 A1 2/2019 Davydov et al.
(Continued)

FOREIGN PATENT DOCUMENTS

WO 2018064348 A1 4/2018

OTHER PUBLICATIONS

ETSI TS 138 521-4 v15.1.0, "Universal Mobile Telecommunications System (UMTS); Multiplexing and channel coding (FDD)", 3GPP TS 38.521-4 version 15.1.0 Release 15 (Jul. 2019), 322 pages.

*Primary Examiner* — Andrew Lai
*Assistant Examiner* — Andrew C Lee
(74) *Attorney, Agent, or Firm* — Qualcomm IP Dept.; James Hunt Yancey, Jr.

(57) ABSTRACT

In some aspects, a UE may select a first type of antenna for communication with a base station based at least in part on a beam management procedure that uses an RSRP parameter determined using a downlink reference signal associated with a single antenna port; measure a CSI-RS resource for CSF, associated with multiple antenna ports, using a second type of antenna and after selecting the first type of antenna; compare a first spectral efficiency parameter associated with communicating using the first type of antenna and a second spectral efficiency parameter determined based at least in part on measuring the CSI-RS resource for CSF using the second type of antenna; and select one of the first type of antenna or the second type of antenna for subsequent communication with the base station based at least in part on comparing the first spectral efficiency parameter and the second spectral efficiency parameter.

31 Claims, 6 Drawing Sheets

(56) References Cited

U.S. PATENT DOCUMENTS

| | | | |
|---|---|---|---|
| 2019/0068268 A1 | 2/2019 | Zhang et al. | |
| 2019/0069322 A1* | 2/2019 | Davydov | H04W 74/006 |
| 2019/0089435 A1* | 3/2019 | Mondal | H04B 7/088 |
| 2019/0097693 A1* | 3/2019 | Park | H04L 5/0023 |
| 2019/0097712 A1* | 3/2019 | Singh | H04B 7/08 |
| 2019/0132031 A1* | 5/2019 | Park | H04L 5/00 |
| 2019/0166615 A1 | 5/2019 | Nimbalker et al. | |
| 2019/0215701 A1 | 7/2019 | Honglei | |
| 2019/0238208 A1 | 8/2019 | Tang et al. | |
| 2019/0239135 A1* | 8/2019 | Levitsky | H04L 5/0057 |
| 2019/0341981 A1* | 11/2019 | Park | H04B 7/0639 |

\* cited by examiner

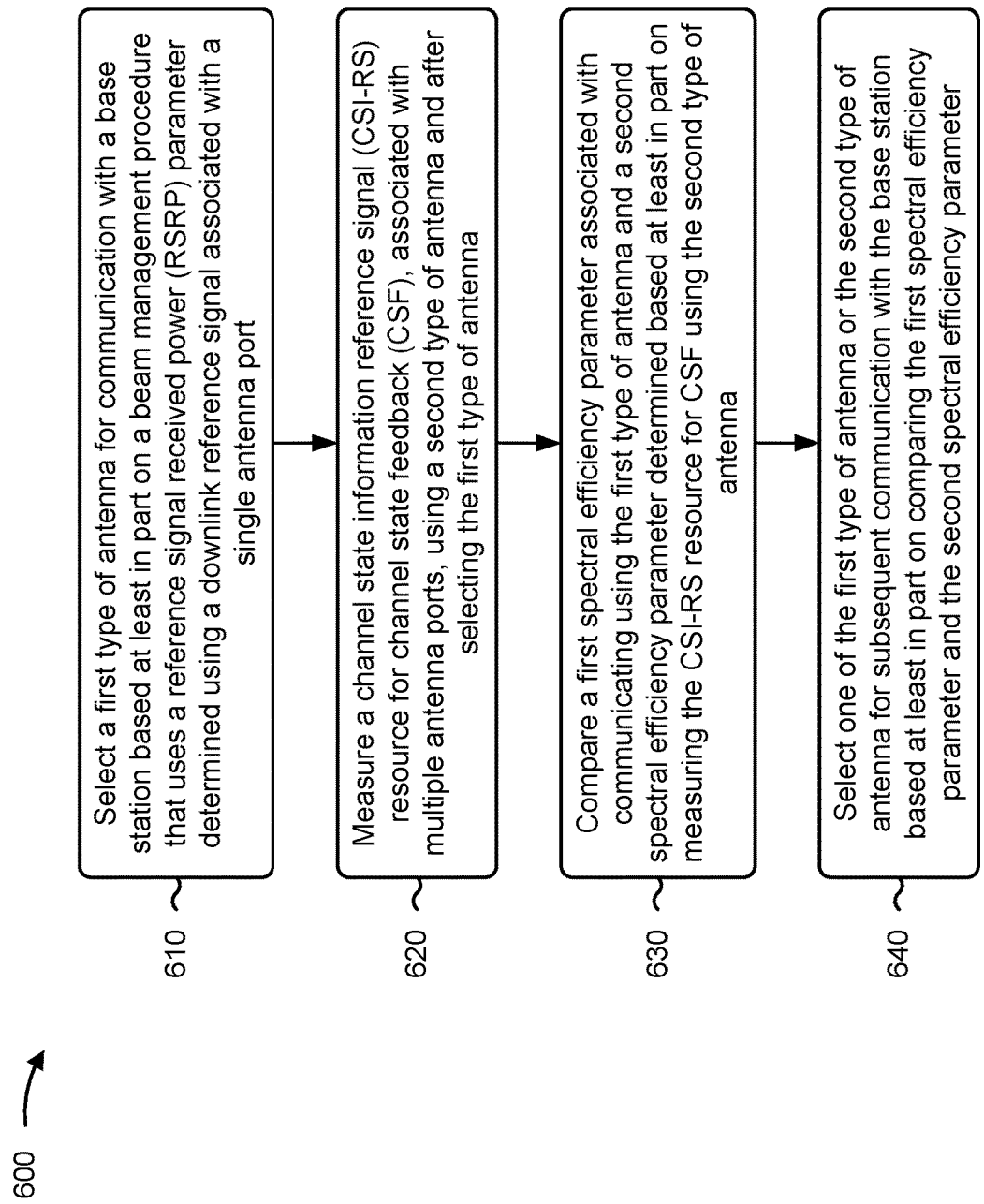

ANTENNA AND BEAM SELECTION USING CSI FOR CHANNEL STATE FEEDBACK RATHER THAN CSI FOR BEAM MANAGEMENT

TECHNICAL FIELD

Aspects of the technology described below generally relate to wireless communication and to techniques and apparatuses for antenna and beam selection using channel state information (CSI) for channel state feedback rather than CSI for beam management. Some techniques and apparatuses described herein enable and provide wireless communication devices and systems configured for improved performance of millimeter wave communication systems.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipments (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. A BS may be referred to as a Node B, a gNB, an access point (AP), a radio head, a transmit receive point (TRP), a new radio (NR) BS, a 5G Node B, and/or the like.

Multiple access technologies have been adopted in various telecommunication standards. Wireless communication standards provide common protocols to enable different devices (e.g., user equipment) to communicate on a municipal, national, regional, and even global level. New radio (NR), which may also be referred to as 5G, is a set of enhancements to the LTE mobile standard promulgated by the Third Generation Partnership Project (3GPP). As demand for mobile broadband access continues to increase, there exists a need for further improvements in LTE and NR technologies. These improvements can apply to other multiple access technologies and the telecommunication standards that employ these technologies.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. The purpose of the summary is to present some concepts of one or more aspects of the disclosure in summary form as a prelude to the more detailed description that is presented below.

Some techniques and apparatuses described herein allow a user equipment (UE) to improve performance by switching to a patch antenna if the patch antenna provides better performance than a dipole antenna. The dipole antenna may be selected using a downlink reference signal that uses a single port, and the UE may use the patch antenna to obtain a more accurate representation of channel quality using CSI for channel state feedback (CSF) (rather than using a synchronization signal block or CSI for beam management, which both use a single port). CSI for CSF uses multiple ports (e.g., two ports), which allows for a more accurate determination of channel quality as compared to using a single port. Using a more accurate representation of channel quality permits the UE to better compare channels and select an antenna and a beam that will provide better performance (e.g., higher throughput, less interference, higher reliability, and/or the like).

In some aspects, a method of wireless communication, performed by a UE, may include selecting a first type of antenna for communication with a base station based at least in part on a beam management procedure that uses a reference signal received power (RSRP) parameter determined using a downlink reference signal associated with a single antenna port; measuring a channel state information reference signal (CSI-RS) resource for CSF, associated with multiple antenna ports, using a second type of antenna and after selecting the first type of antenna; comparing a first spectral efficiency parameter associated with communicating using the first type of antenna and a second spectral efficiency parameter determined based at least in part on measuring the CSI-RS resource for CSF using the second type of antenna; and selecting one of the first type of antenna or the second type of antenna for subsequent communication with the base station based at least in part on comparing the first spectral efficiency parameter and the second spectral efficiency parameter.

In some aspects, a UE for wireless communication may include memory and one or more processors operatively coupled to the memory. The memory and the one or more processors may be configured to select a first type of antenna for communication with a base station based at least in part on a beam management procedure that uses an RSRP parameter determined using a downlink reference signal associated with a single antenna port; measure a CSI-RS resource for CSF, associated with multiple antenna ports, using a second type of antenna and after selecting the first type of antenna; compare a first spectral efficiency parameter associated with communicating using the first type of antenna and a second spectral efficiency parameter determined based at least in part on measuring the CSI-RS resource for CSF using the second type of antenna; and select one of the first type of antenna or the second type of antenna for subsequent communication with the base station based at least in part on comparing the first spectral efficiency parameter and the second spectral efficiency parameter.

In some aspects, a non-transitory computer-readable medium may store one or more instructions for wireless communication. The one or more instructions, when executed by one or more processors of a UE, may cause the one or more processors to: select a first type of antenna for communication with a base station based at least in part on a beam management procedure that uses an RSRP parameter determined using a downlink reference signal associated with a single antenna port; measure a CSI-RS resource for CSF, associated with multiple antenna ports, using a second type of antenna and after selecting the first type of antenna; compare a first spectral efficiency parameter associated with communicating using the first type of antenna and a second spectral efficiency parameter determined based at least in part on measuring the CSI-RS resource for CSF using the second type of antenna; and select one of the first type of antenna or the second type of antenna for subsequent communication with the base station based at least in part on comparing the first spectral efficiency parameter and the second spectral efficiency parameter.

In some aspects, an apparatus for wireless communication may include means for selecting a first type of antenna for communication with a base station based at least in part on a beam management procedure that uses an RSRP parameter determined using a downlink reference signal associated with a single antenna port; means for measuring a CSI-RS resource for CSF, associated with multiple antenna ports, using a second type of antenna and after selecting the first type of antenna; means for comparing a first spectral efficiency parameter associated with communicating using the first type of antenna and a second spectral efficiency parameter determined based at least in part on measuring the CSI-RS resource for CSF using the second type of antenna; and means for selecting one of the first type of antenna or the second type of antenna for subsequent communication with the base station based at least in part on comparing the first spectral efficiency parameter and the second spectral efficiency parameter.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description is provided herein, with some aspects of the disclosure being illustrated in the appended drawings. However, the appended drawings illustrate only some aspects of this disclosure and are therefore not to be considered limiting of the scope of the disclosure. The same reference numbers in different drawings may identify the same or similar elements.

FIG. 6 is a diagram illustrating an example process performed, for example, by a user equipment, in accordance with various aspects of the present disclosure.

DETAILED DESCRIPTION

Figure 1:
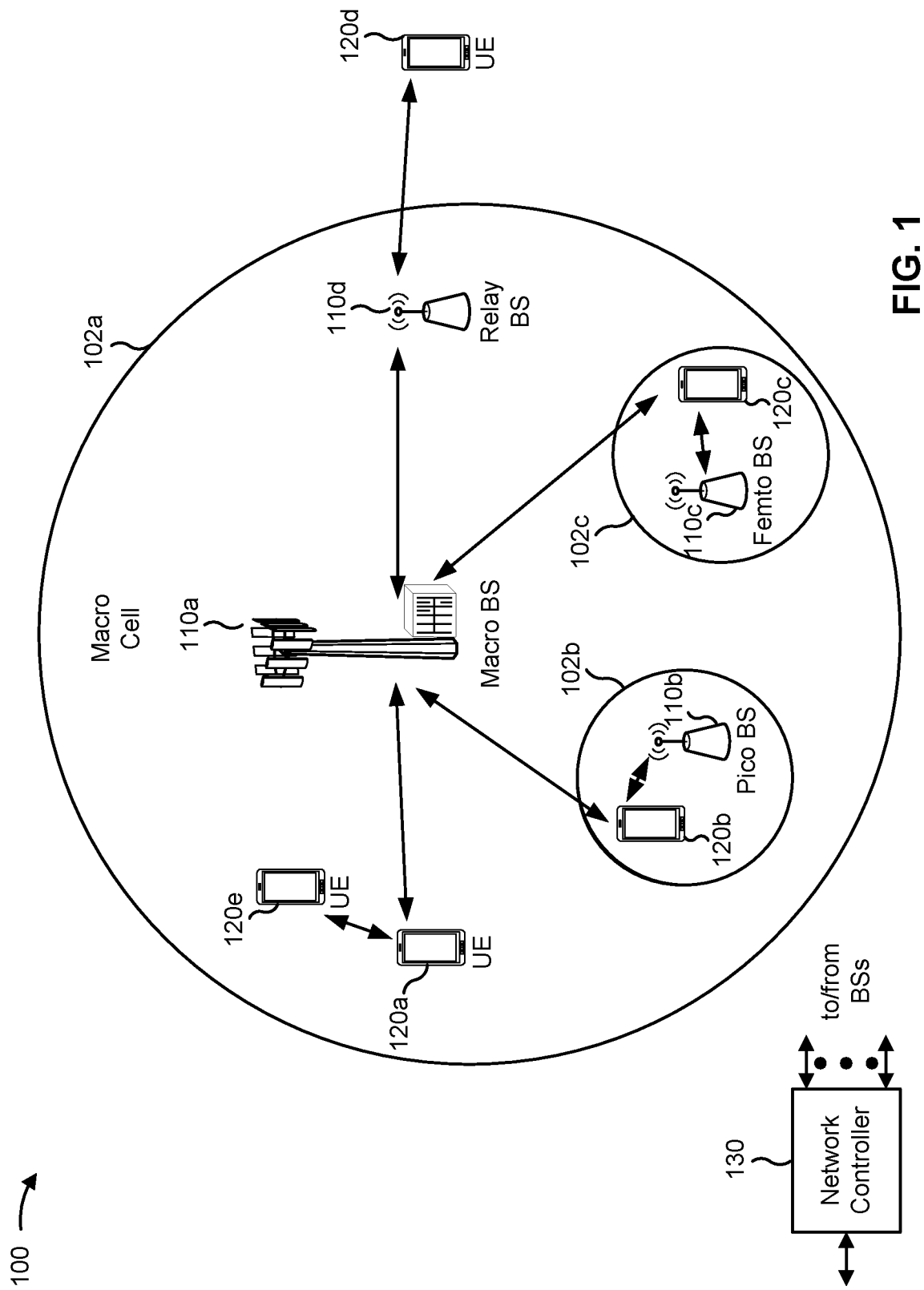
FIG. 1 is a block diagram conceptually illustrating an example of a wireless communication network, in accordance with various aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements" or "features"). These elements may be implemented using hardware, software, or combinations thereof. Whether such elements are implemented as hardware or software depends upon the particular application and design constraints imposed on the overall system.

While some aspects may be described herein using terminology commonly associated with 3G and/or 4G wireless technologies, aspects of the present disclosure can be applied in other generation-based communication systems, such as 5G and later, including NR technologies.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, and/or the like). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including one or more antennas, RF-chains, power amplifiers, modulators, buffers, processors, interleavers, adders/summers, and/or the like). It is intended that innovations described herein may be practiced in a wide variety of devices, chip-level components, systems, distributed arrangements, end-user devices, etc. of varying sizes, shapes, and constitution.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipments (UEs) and may also be referred to as a base station, a NR BS, a Node B, a gNB, a 5G node B (NB), an access point, a transmit receive point (TRP), and/or the like. Each BS may provide communication coverage for a particular area (e.g., a fixed or changing geographical area). In some scenarios, BSs 110 may be stationary or non-stationary. In some non-stationary scenarios, mobile BSs 110 may move with varying speeds, direction, and/or heights. In 3GPP, the term "cell" can refer to a coverage area of a BS 110 and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. Additionally, or alternatively, a BS may support access to an unlicensed RF band (e.g., a Wi-Fi band and/or the like). A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network. In other scenarios, BSs may be implemented in a software defined network (SDN) manner or via network function virtualization (NFV) manner.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, robotics, drones, implantable devices, augmented reality devices, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. These components may be integrated in a variety of combinations and/or may be stand-alone, distributed components considering design constraints and/or operational preferences.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110. A UE performing scheduling operations can include or perform base-station-like functions in these deployment scenarios.

As indicated above, FIG. 1 is provided as an example. Other examples may differ from what is described with regard to FIG. 1.

Figure 2:
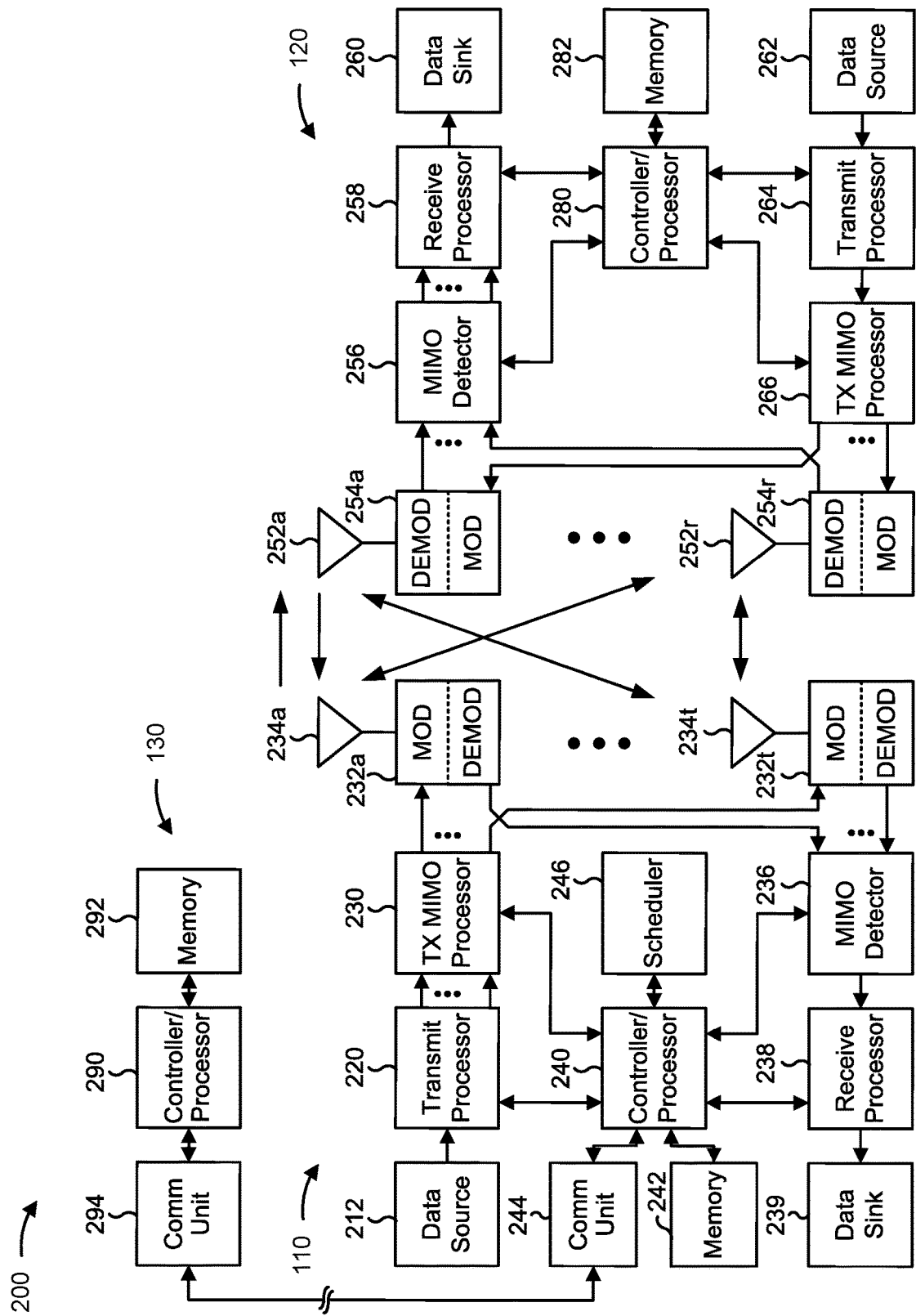
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1. The T and R antennas may be configured with multiple antenna elements formed in an array for MIMO or massive MIMO deployments that can occur in millimeter wave (mmWave or mmW) communication systems.

At base station 110, a transmit processor 220 can carry out a number of functions associated with communications. For example, transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive downlink RF signals. The downlink RF signals may be received from and/or may be transmitted by one or more base stations 110. The signals can be provided to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

For uplink communications, a UE 120 may transmit control information and/or data to another device, such as one or more base stations 110. For example, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with antenna and beam selection using CSI for channel state feedback rather than CSI for beam management, as described in more detail elsewhere herein. For example, controller/processor 240 of base station 110, controller/processor 280 of UE 120, and/or any other component(s) of FIG. 2 may perform or direct operations of, for example, process 600 of FIG. 6 and/or other processes as described herein. Memories 242 and 282 may store data and program codes for base station 110 and UE 120, respectively. A scheduler 246 may schedule UEs for data transmission on the downlink and/or uplink.

In some aspects, the UE 120 may include a variety of means or components for implementing communication functions. For example, the variety of means may include means for selecting a first type of antenna for communication with a base station based at least in part on a beam management procedure that uses an RSRP parameter determined using a downlink reference signal associated with a single antenna port; means for measuring a CSI-RS resource for CSF, associated with multiple antenna ports, using a second type of antenna and after selecting the first type of antenna; means for comparing a first spectral efficiency parameter associated with communicating using the first type of antenna and a second spectral efficiency parameter determined based at least in part on measuring the CSI-RS resource for CSF using the second type of antenna; means for selecting one of the first type of antenna or the second type of antenna for subsequent communication with the base station based at least in part on comparing the first spectral efficiency parameter and the second spectral efficiency parameter; and/or the like.

In some aspects, the UE 120 may include a variety of structural components for carrying out functions of the various means. For example, structural components that carry out functions of such means may include one or more components of UE 120 described in connection with FIG. 2, such as antenna 252, DEMOD 254, MOD 254, MIMO detector 256, receive processor 258, transmit processor 264, TX MIMO processor 266, controller/processor 280, and/or the like.

As indicated above, FIG. 2 is provided as an example. Other examples may differ from what is described with regard to FIG. 2.

Figure 3:
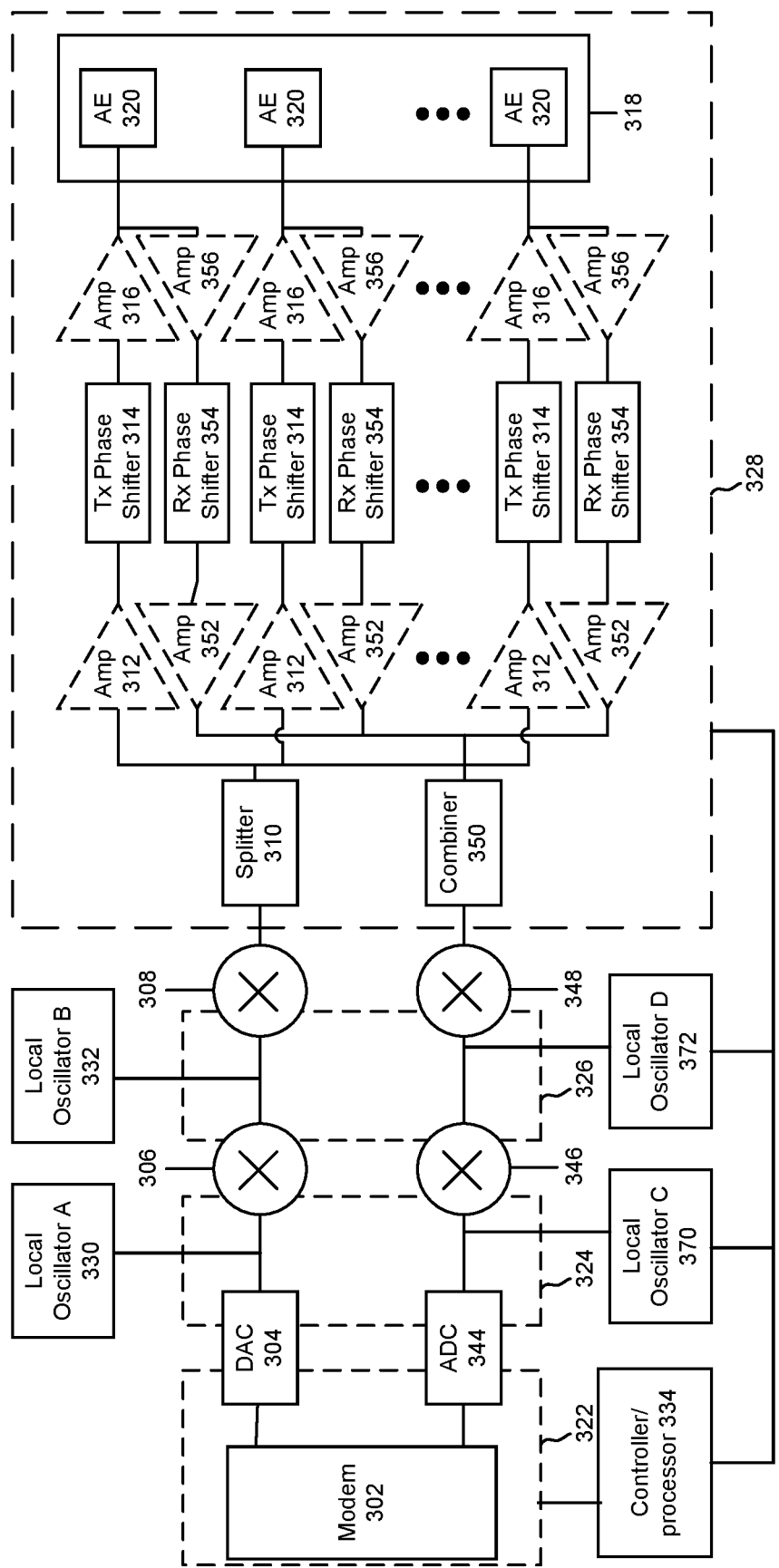
FIG. 3 is a diagram illustrating an example architecture that supports determining sub-dominant clusters in a millimeter wave channel, in accordance with various aspects of the present disclosure

FIG. 3 is a diagram illustrating an example architecture 300 that supports determining sub-dominant clusters in a millimeter wave (mmW) channel, in accordance with various aspects of the present disclosure. In some aspects, architecture 300 may implement aspects of wireless network 100. In some aspects, architecture 300 may be implemented in a transmitting device (e.g., a first wireless communication device, UE, or base station) and/or a receiving device (e.g., a second wireless communication device, UE, or base station), as described herein.

Broadly, FIG. 3 is a diagram illustrating example hardware components of a wireless communication device in accordance with certain aspects of the disclosure. The illustrated components may include those that may be used for antenna element selection and/or for beamforming for transmission of wireless signals. There are numerous architectures for antenna element selection and implementing phase shifting, only one example of which is illustrated here. The architecture 300 includes a modem (modulator/demodulator) 302, a digital to analog converter (DAC) 304, a first mixer 306, a second mixer 308, and a splitter 310. The architecture 300 also includes a plurality of first amplifiers 312, a plurality of phase shifters 314, a plurality of second amplifiers 316, and an antenna array 318 that includes a plurality of antenna elements 320. Transmission lines or other waveguides, wires, traces, and/or the like are shown connecting the various components to illustrate how signals to be transmitted may travel between components. Reference numbers 322, 324, 326, and 328 indicate regions in the architecture 300 in which different types of signals travel or are processed. Specifically, reference number 322 indicates a region in which digital baseband signals travel or are processed, reference number 324 indicates a region in which analog baseband signals travel or are processed, reference number 326 indicates a region in which analog intermediate frequency (IF) signals travel or are processed, and reference number 328 indicates a region in which analog radio frequency (RF) signals travel or are processed. The architecture also includes a local oscillator A 330, a local oscillator B 332, and a controller/processor 334.

Each of the antenna elements 320 may include one or more sub-elements for radiating or receiving RF signals. For example, a single antenna element 320 may include a first sub-element cross-polarized with a second sub-element that can be used to independently transmit cross-polarized signals. The antenna elements 320 may include patch antennas, dipole antennas, or other types of antennas arranged in a linear pattern, a two dimensional pattern, or another pattern. A spacing between antenna elements 320 may be such that signals with a desired wavelength transmitted separately by the antenna elements 320 may interact or interfere (e.g., to form a desired beam). For example, given an expected range of wavelengths or frequencies, the spacing may provide a quarter wavelength, half wavelength, or other fraction of a wavelength of spacing between neighboring antenna elements 320 to allow for interaction or interference of signals transmitted by the separate antenna elements 320 within that expected range.

The modem 302 processes and generates digital baseband signals and may also control operation of the DAC 304, first and second mixers 306, 308, splitter 310, first amplifiers 312, phase shifters 314, and/or the second amplifiers 316 to transmit signals via one or more or all of the antenna elements 320. The modem 302 may process signals and control operation in accordance with a communication standard such as a wireless standard discussed herein. The DAC 304 may convert digital baseband signals received from the modem 302 (and that are to be transmitted) into analog baseband signals. The first mixer 306 upconverts analog baseband signals to analog IF signals within an IF using a local oscillator A 330. For example, the first mixer 306 may mix the signals with an oscillating signal generated by the local oscillator A 330 to "move" the baseband analog signals to the IF. In some cases, some processing or filtering (not shown) may take place at the IF. The second mixer 308 upconverts the analog IF signals to analog RF signals using the local oscillator B 332. Similar to the first mixer, the second mixer 308 may mix the signals with an oscillating signal generated by the local oscillator B 332 to "move" the IF analog signals to the RF or the frequency at which signals will be transmitted or received. The modem 302 and/or the controller/processor 334 may adjust the frequency of local oscillator A 330 and/or the local oscillator B 332 so that a desired IF and/or RF frequency is produced and used to facilitate processing and transmission of a signal within a desired bandwidth.

In the illustrated architecture 300, signals upconverted by the second mixer 308 are split or duplicated into multiple signals by the splitter 310. The splitter 310 in architecture 300 splits the RF signal into a plurality of identical or nearly identical RF signals. In other examples, the split may take place with any type of signal, including with baseband digital, baseband analog, or IF analog signals. Each of these signals may correspond to an antenna element 320, and the signal travels through and is processed by amplifiers 312, 316, phase shifters 314, and/or other elements corresponding to the respective antenna element 320 to be provided to and transmitted by the corresponding antenna element 320 of the antenna array 318. In one example, the splitter 310 may be an active splitter that is connected to a power supply and provides some gain so that RF signals exiting the splitter 310 are at a power level equal to or greater than the signal entering the splitter 310. In another example, the splitter 310 is a passive splitter that is not connected to power supply and the RF signals exiting the splitter 310 may be at a power level lower than the RF signal entering the splitter 310.

After being split by the splitter 310, the resulting RF signals may enter an amplifier, such as a first amplifier 312, or a phase shifter 314 corresponding to an antenna element 320. The first and second amplifiers 312, 316 are illustrated with dashed lines because one or both of them might not be necessary in some aspects. In some aspects, both the first amplifier 312 and second amplifier 314 are present. In some aspects, neither the first amplifier 312 nor the second amplifier 314 is present. In some aspects, one of the two amplifiers 312, 314 is present but not the other. By way of example, if the splitter 310 is an active splitter, the first amplifier 312 may not be used. By way of further example, if the phase shifter 314 is an active phase shifter that can provide a gain, the second amplifier 316 might not be used. The amplifiers 312, 316 may provide a desired level of positive or negative gain. A positive gain (positive dB) may be used to increase an amplitude of a signal for radiation by a specific antenna element 320. A negative gain (negative dB) may be used to decrease an amplitude and/or suppress radiation of the signal by a specific antenna element. Each of the amplifiers 312, 316 may be controlled independently (e.g., by the modem 302 or the controller/processor 334) to provide independent control of the gain for each antenna element 320. For example, the modem 302 and/or the controller/processor 334 may have at least one control line connected to each of the splitter 310, first amplifiers 312, phase shifters 314, and/or second amplifiers 316 that may be used to configure a gain to provide a desired amount of gain for each component and thus each antenna element 320.

The phase shifter 314 may provide a configurable phase shift or phase offset to a corresponding RF signal to be transmitted. The phase shifter 314 may be a passive phase shifter not directly connected to a power supply. Passive phase shifters might introduce some insertion loss. The second amplifier 316 may boost the signal to compensate for the insertion loss. The phase shifter 314 may be an active phase shifter connected to a power supply such that the active phase shifter provides some amount of gain or prevents insertion loss. The settings of each of the phase shifters 314 are independent, meaning that each can be set to provide a desired amount of phase shift or the same amount of phase shift or some other configuration. The modem 302 and/or the controller/processor 334 may have at least one control line connected to each of the phase shifters 314 and which may be used to configure the phase shifters 314 to provide desired amounts of phase shift or phase offset between antenna elements 320.

In the illustrated architecture 300, RF signals received by the antenna elements 320 are provided to one or more of first amplifiers 356 to boost the signal strength. The first amplifiers 356 may be connected to the same antenna arrays 318 (e.g., for time division duplex (TDD) operations). The first amplifiers 356 may be connected to different antenna arrays 318. The boosted RF signal is input into one or more of phase shifters 354 to provide a configurable phase shift or phase offset for the corresponding received RF signal. The phase shifter 354 may be an active phase shifter or a passive phase shifter. The settings of the phase shifters 354 are independent, meaning that each can be set to provide a desired amount of phase shift or the same amount of phase shift or some other configuration. The modem 302 and/or the controller/processor 334 may have at least one control line connected to each of the phase shifters 354 and which may be used to configure the phase sifters 354 to provide a desired amount of phase shift or phase offset between antenna elements 320.

The outputs of the phase shifters 354 may be input to one or more second amplifiers 352 for signal amplification of the phase shifted received RF signals. The second amplifiers 352 may be individually configured to provide a configured amount of gain. The second amplifiers 352 may be individually configured to provide an amount of gain to ensure that the signals input to combiner 350 have the same magnitude. The amplifiers 352 and/or 356 are illustrated in dashed lines because they might not be necessary in some aspects. In some aspects, both the amplifier 352 and the amplifier 356 are present. In another aspect, neither the amplifier 352 nor the amplifier 356 are present. In other aspects, one of the amplifiers 352, 356 is present but not the other.

In the illustrated architecture 300, signals output by the phase shifters 354 (via the amplifiers 352 when present) are combined in combiner 350. The combiner 350 in architecture 300 combines the RF signal into a signal. The combiner 350 may be a passive combiner (e.g., not connected to a power source), which may result in some insertion loss. The combiner 350 may be an active combiner (e.g., connected to a power source), which may result in some signal gain. When combiner 350 is an active combiner, it may provide a different (e.g., configurable) amount of gain for each input signal so that the input signals have the same magnitude when they are combined. When combiner 350 is an active combiner, the combiner 350 may not need the second amplifier 352 because the active combiner may provide the signal amplification.

The output of the combiner 350 is input into mixers 348 and 346. Mixers 348 and 346 generally down convert the received RF signal using inputs from local oscillators 372 and 370, respectively, to create intermediate or baseband signals that carry the encoded and modulated information. The output of the mixers 348 and 346 are input into an analog-to-digital converter (ADC) 344 for conversion to analog signals. The analog signals output from ADC 344 is input to modem 302 for baseband processing, such as decoding, de-interleaving, and/or the like.

The architecture 300 is given by way of example only to illustrate an architecture for transmitting and/or receiving signals. In some cases, the architecture 300 and/or each portion of the architecture 300 may be repeated multiple times within an architecture to accommodate or provide an arbitrary number of RF chains, antenna elements, and/or antenna panels. Furthermore, numerous alternate architectures are possible and contemplated. For example, although only a single antenna array 318 is shown, two, three, or more antenna arrays may be included, each with one or more of their own corresponding amplifiers, phase shifters, splitters, mixers, DACs, ADCs, and/or modems. For example, a single UE may include two, four, or more antenna arrays for transmitting or receiving signals at different physical locations on the UE or in different directions. Furthermore, mixers, splitters, amplifiers, phase shifters and other components may be located in different signal type areas (e.g., represented by different ones of the reference numbers 322, 324, 326, 328) in different implemented architectures. For example, a split of the signal to be transmitted into a plurality of signals may take place at the analog RF, analog IF, analog baseband, or digital baseband frequencies in different examples. Similarly, amplification and/or phase shifts may also take place at different frequencies. For example, in some aspects, one or more of the splitter 310, amplifiers 312, 316, or phase shifters 314 may be located between the DAC 304 and the first mixer 306 or between the first mixer 306 and the second mixer 308. In one example, the functions of one or more of the components may be combined into one component. For example, the phase shifters 314 may perform amplification to include or replace the first and/or or second amplifiers 312, 316. By way of another example, a phase shift may be implemented by the second mixer 308 to obviate the need for a separate phase shifter 314. This technique is sometimes called local oscillator (LO) phase shifting. In some aspects of this configuration, there may be a plurality of IF to RF mixers (e.g., for each antenna element chain) within the second mixer 308, and the local oscillator B 332 may supply different local oscillator signals (with different phase offsets) to each IF to RF mixer.

The modem 302 and/or the controller/processor 334 may control one or more of the other components 304 through 372 to select one or more antenna elements 320 and/or to form beams for transmission of one or more signals. For example, the antenna elements 320 may be individually selected or deselected for transmission of a signal (or signals) by controlling an amplitude of one or more corresponding amplifiers, such as the first amplifiers 312 and/or the second amplifiers 316. Beamforming includes generation of a beam using a plurality of signals on different antenna elements, where one or more or all of the plurality of signals are shifted in phase relative to each other. The formed beam may carry physical or higher layer reference signals or information. As each signal of the plurality of signals is radiated from a respective antenna element 320, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 318) can be dynamically controlled by modifying the phase shifts or phase offsets imparted by the phase shifters 314 and amplitudes imparted by the amplifiers 312, 316 of the plurality of signals relative to each other. The controller/processor 334 may be located partially or fully within one or more other components of the architecture 300. For example, the controller/processor 334 may be located within the modem 302 in some aspects.

As indicated above, FIG. 3 is provided as an example. Other examples may differ from what is described with regard to FIG. 3.

Figure 4:
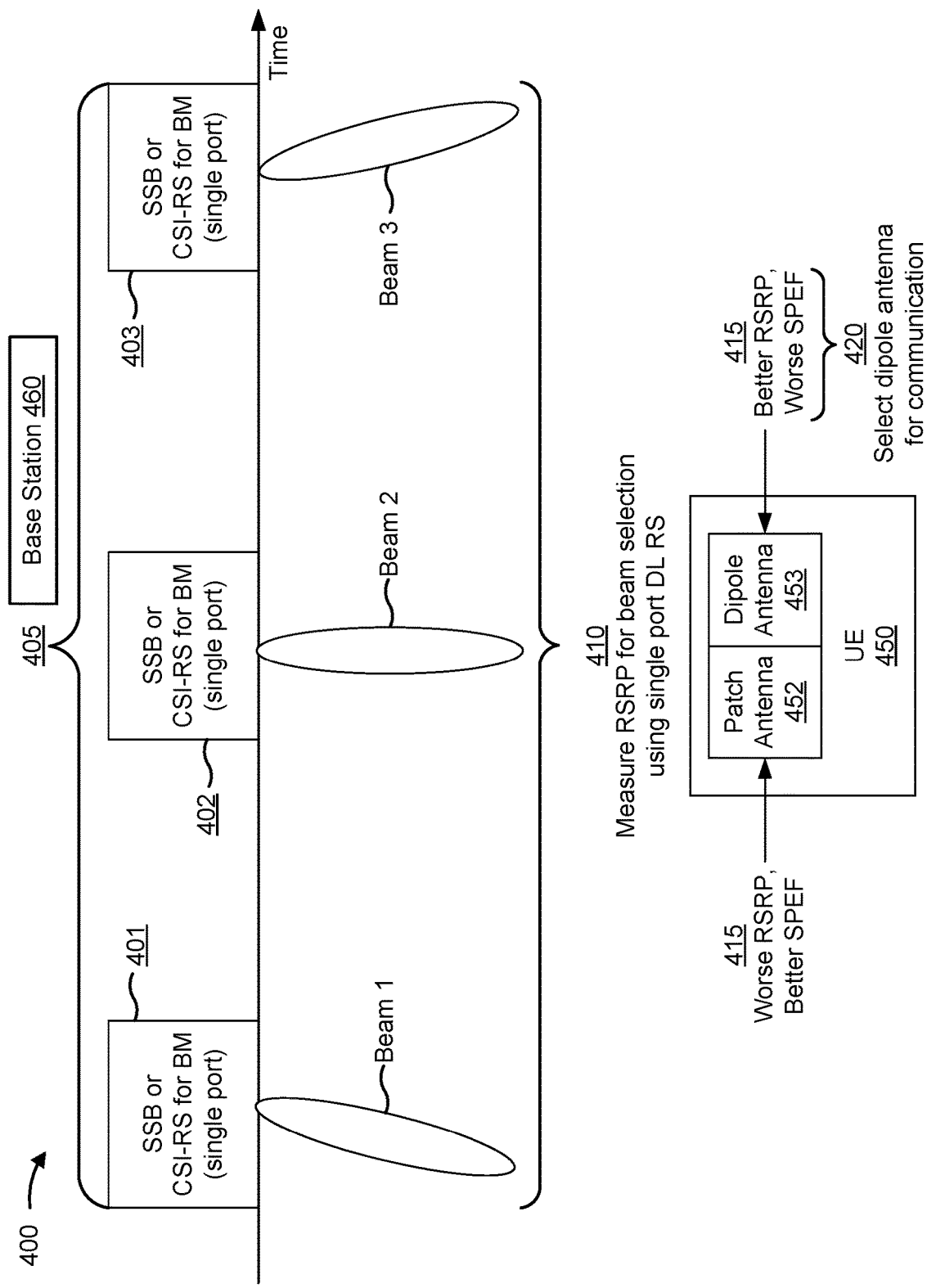
FIG. 4 is a diagram illustrating an example of antenna and beam selection using a reference signal received power parameter and a single port downlink reference signal, in accordance with various aspects of the present disclosure.

FIG. 4 is a diagram illustrating an example 400 of antenna and beam selection using a reference signal received power parameter and a single port downlink reference signal, in accordance with various aspects of the present disclosure.

As shown in FIG. 4, a base station 460 may transmit downlink reference signals to assist with beam selection for a UE 450 (e.g., for selection of a millimeter wave beam). For example, the base station 460 may use beam-sweeping to transmit a set of synchronization signal blocks (SSBs) (e.g., an SS burst, an SS burst set, and/or the like) on different beams at different times for initial network access to select an initial beam (e.g., for a P1 beam management procedure used for selection of an initial beam during network access). Additionally, or alternatively, the base station 460 may use beam-sweeping to transmit a set of channel state information reference signals (CSI-RSs) for beam management (BM) on different beams at different times for beam refinement (e.g., for a P3 beam management procedure used to refine a beam after initial network access).

For example, as shown by reference number 405, the base station 460 may transmit a first downlink reference signal 401 on a first beam (shown as Beam 1) at a first time, may transmit a second downlink reference signal 402 on a second beam (shown as Beam 2) at a second time, may transmit a third downlink reference signal 403 on a third beam (shown as Beam 3) at a third time, and so on. As shown, the downlink reference signal may be transmitted on a single antenna port. For example, an SSB may be transmitted on a single antenna port. Similarly, a CSI-RS for BM may be transmitted on a single antenna port. As used herein, an antenna port may be referred to as a port.

As shown by reference number 410, a UE 450 may measure a reference signal received power (RSRP) parameter of the downlink reference signals (DL RSs) 401, 402, 403 using a single port. For example, the UE 450 may measure the received downlink reference signal(s) on a single port, and may determine a respective RSRP parameter based at least in part on the measurement on the single port. The UE 450 may compare multiple RSRP parameters determined for multiple received downlink reference signals 401, 402, 403 (e.g., one RSRP parameter per downlink reference signal) to identify a downlink reference signal associated with the best RSRP parameter. The UE 450 may select a beam (e.g., a receive (Rx) beam) associated with the identified downlink reference signal 401, 402, and/or 403, and/or may indicate the beam (or a set of beams associated with the best RSRP parameters) to the base station 460 for a beam selection procedure.

As further shown, the UE 450 may include multiple types of antennas. These antennas may be used to assist with beamforming. For example, the UE 450 may include a patch antenna 452 and a dipole antenna 453. A patch antenna is sometimes referred to as a microstrip antenna or a printed antenna. A dipole antenna is sometimes referred to as a doublet. A dipole antenna may provide better directional coverage than a patch antenna, while a patch antenna may provide better performance for multi-layer communications (e.g., multiple input multiple output (MIMO) communications) using rank 2, due to better horizontal/vertical polarization characteristics than a dipole antenna. In some cases, the UE 450 may use a dipole antenna 453 for a first set of beams (e.g., a first set of Rx beams), and may use a patch antenna 452 for a second set of beams (e.g., a second set of Rx beams). Although a patch antenna and a dipole antenna are shown as examples, other types of antennas may be used, including two patch antennas with different characteristics, two dipole antennas with different characteristics, and/or the like.

As shown by reference number 415, a set of measurements using the patch antenna 452 may result in worse RSRP values as compared to corresponding measurements using the dipole antenna 453. For example, a first beam measured by the dipole antenna 453 (e.g., the best beam measured by the dipole antenna 453 (e.g., one of Beams 1, 2 or 3)) may have a better RSRP value than a second beam measured by the patch antenna 452 (e.g., the best beam measured by the patch antenna 452 (e.g., one of Beams 1, 2 or 3)) in substantially the same direction. However, if the UE 450 were to carry out the set of measurements using more detailed information, then antenna switching could be improved. Thus, when using multiple antennas, and using CSI for CSF (which uses multiple antenna ports), the determination of channel quality can be improved compared to using a single antenna port. Thus, using the patch antenna 452, the UE 450 may determine that the measurements may result in better spectral efficiency (SPEF) values as compared to the dipole antenna 453 when measuring CSI for CSF. In the present case, the best RSRP parameter, from the set of RSRP parameters determined by the UE 450 from measuring the set of single port downlink reference signals 401, 402, 403, corresponds to a measurement obtained using the dipole antenna 453. In this case, as shown by reference number 420, the UE 450 selects the dipole antenna 453 for communications with the base station.

However, as shown, selection of the patch antenna 452 may have provided better performance than selection of the dipole antenna 453 because an RSRP parameter may not provide a complete representation of channel quality, and performing beam management using single port downlink reference signals may result in sub-optimal beam selection. In example 400, the UE selects the dipole antenna 453 even though selection of the patch antenna 452 would have provided better spectral efficiency and better performance by utilizing MIMO communications. This is because the UE 450 in this case is only able to utilize a single antenna port when using CSI-RS for BM. The inventors have determined that using multiple ports and thus using CSI-RS for CSF would provide a more accurate representation of channel quality, and this can be used to improve antenna switching compared to the state of the art of using a single port with CSI-RS for BM.

Some techniques and apparatuses described herein allow a UE to improve performance by switching to the patch antenna if the patch antenna provides better performance than the dipole antenna. For example, the UE 450 may use the patch antenna 452 to obtain a more accurate representation of channel quality using CSI for channel state feedback (CSF) (rather than CSI for BM). CSI for CSF uses multiple ports (e.g., two ports), which allows for a more accurate determination of channel quality as compared to using a single port. Using a more accurate representation of channel quality permits the UE to better compare channels and select an antenna and a beam that will provide better performance (e.g., higher throughput, less interference, higher reliability, and/or the like).

As indicated above, FIG. 4 is provided as an example. Other examples may differ from what is described with regard to FIG. 4.

Figure 5:
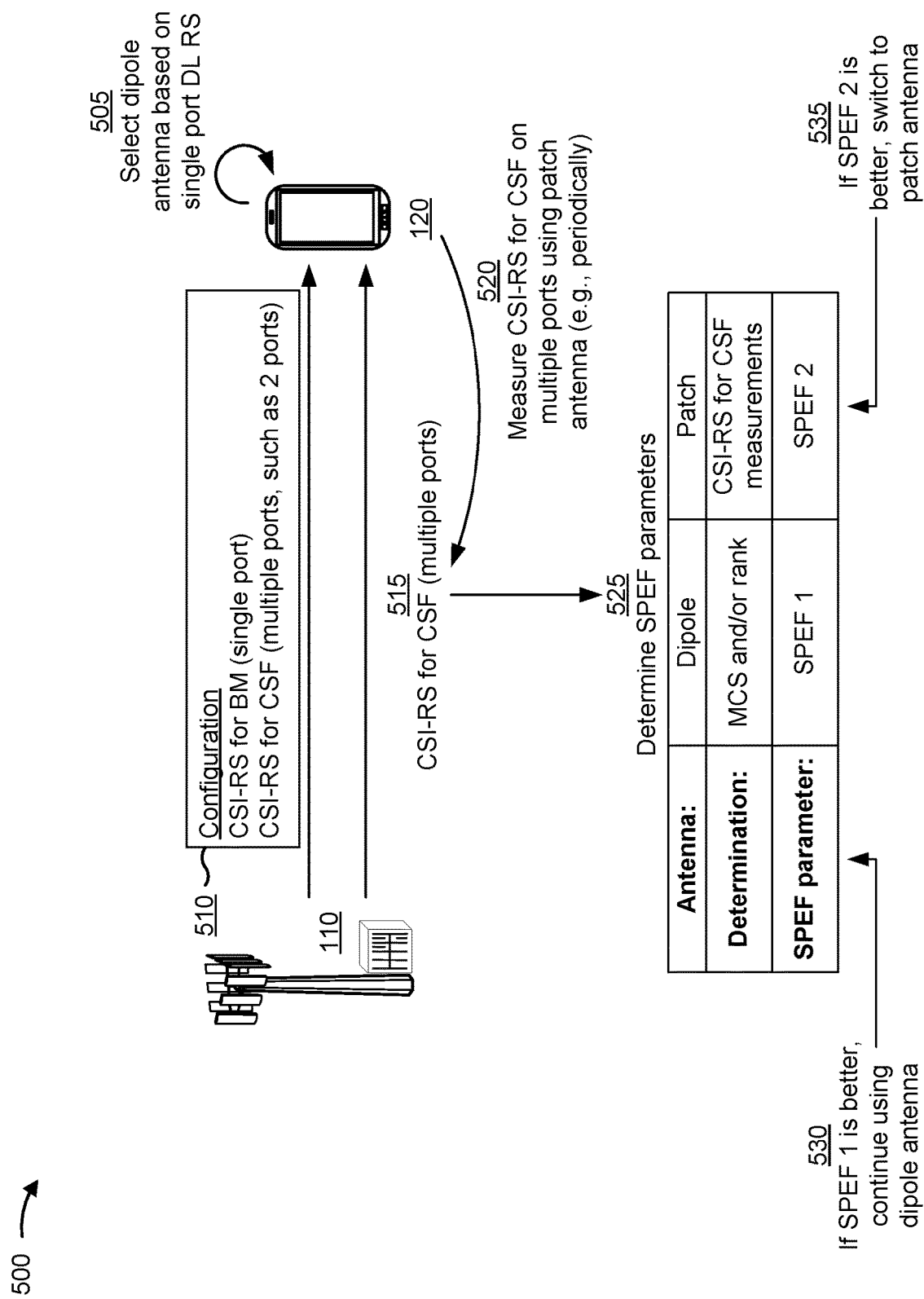
FIG. 5 is a diagram illustrating an example of antenna and beam selection using channel state information (CSI) for channel state feedback rather than CSI for beam management, in accordance with various aspects of the present disclosure.

FIG. 5 is a diagram illustrating an example 500 of antenna and beam selection using CSI for channel state feedback rather than CSI for beam management, in accordance with various aspects of the present disclosure. As shown in FIG. 5, a base station 110 and a UE 120 may communicate with one another.

As shown by reference number 505, the UE 120 may select a first type of antenna (e.g., a dipole antenna) for communication with the base station 110. In example 500, the first type of antenna is a dipole antenna, but the first type of antenna may be another type of antenna other than a dipole antenna, in some aspects. For example, the first antenna and/or the second antenna may include a microstrip antenna, a printed antenna, a doublet. In some aspects, the first antenna may include an antenna that provides better directional coverage than the second antenna. Additionally, or alternatively, the second antenna may include an antenna that provides better performance for multi-layer communications (e.g., MIMO communications) using a higher rank (e.g., rank 2 or higher), such as an antenna with better horizontal/vertical polarization characteristics than the first antenna. In some aspects, the first antenna and the second antenna may be the same type of antenna with different characteristics.

The UE 120 may select the dipole antenna based at least in part on measuring a set of single port downlink reference signals (DL RSs), as described above in connection with FIG. 4. For example, a single port downlink reference signal may include an SSB, a CSI-RS for BM, and/or the like. As described above in connection with FIG. 4, the UE 120 may perform a beam management procedure that includes comparing RSRP values for different measurements of the single port downlink reference signal (e.g., on different beams). The UE 120 may select the dipole antenna and a corresponding beam based at least in part on performing the beam management procedure. For example, the best beam indicated by the beam management procedure may be a beam with the best RSRP parameter, which may be a beam (e.g., an Rx beam) that is formed and/or obtained using the dipole antenna (and not a beam that is formed and/or obtained using a patch antenna). However, the selected beam may be a sub-optimal beam, as described above in connection with FIG. 4.

As shown by reference number 510, the base station 110 may transmit a configuration to the UE 120. As shown, the configuration may include a CSI-RS for BM configuration, and a CSI-RS for CSF configuration. For example, the CSI-RS for BM configuration may indicate one or more CSI-RS resources (e.g., time resources, frequency resources, spatial resources, beams, ports, and/or the like) to be used for beam management. Similarly, the CSI-RS for CSF configuration may indicate one or more CSI-RS resources (e.g., time resources, frequency resources, spatial resources, beams, ports, and/or the like) to be used for channel state feedback. The CSI-RS for BM and the CSI-RS for CSF may be configured, transmitted, and/or received in different resources. As described above in connection with FIG. 4, CSI-RS for BM may use a single port (e.g., may be transmitted and received using a single port), and CSI-RS for CSF may use multiple ports (e.g., may be transmitted and received using multiple ports, such as two ports). The configuration may be included in, for example, a radio resource control (RRC) message (e.g., an RRC configuration message, an RRC reconfiguration message, and/or the like), a medium access control (MAC) control element (CE) (collectively, MAC-CE), downlink control information (DCI), and/or the like.

As shown by reference number 515, the base station 110 may transmit a CSI-RS for CSF (e.g., one or more CSI-RSs for CSF), according to the CSI-RS for CSF configuration. For example, the base station 110 may transmit a set of CSI-RSs in a set of time domain resources, in a set of frequency domain resources, using a set of beams, using a set of ports, and/or the like, indicated in the CSI-RS for CSF configuration. As described above, the base station 110 may transmit a CSI-RS for CSF using multiple ports (e.g., a multi-port transmission), such as by transmitting the CSI-RS for CSF using two ports. In some aspects, the two ports (or the multiple ports) are indicated in the CSI-RS for CSF configuration.

As shown by reference number 520, the UE 120 may measure the CSI-RS for CSF on multiple ports (e.g., two ports) using a second type of antenna (e.g., a patch antenna, a microstrip antenna, a printed antenna, and/or the like). In example 500, the second type of antenna is a patch antenna, but the second type of antenna may be another type of antenna other than a patch antenna, in some aspects. In some aspects, the second type of antenna is different from the first type of antenna. In some aspects, the second type of antenna is the same as the first type of antenna, but has different characteristics (e.g., different radiation patterns, different polarization characteristics, and/or the like). In some aspects, the UE 120 may measure the CSI-RS for CSF on multiple ports (e.g., two ports) using the patch antenna after selecting the dipole antenna. For example, after the UE 120 selects the dipole antenna (e.g., based at least in part on SSB measurements, CSI-RS for BM measurements, and/or measurements of another single port DL RS), the UE 120 may perform measurements of the CSI-RS for CSF on multiple ports using the patch antenna. In some aspects, the UE 120 may perform these measurements periodically.

Additionally, or alternatively, the UE 120 may use the patch antenna to measure the CSI-RS for CSF according to the CSI-RS for CSF configuration. In some aspects, the UE 120 may measure each CSI-RS for CSF resource indicated in the CSI-RS for CSF configuration. However, this may interrupt ongoing UE communications that use the dipole antenna, if the UE 120 is required to switch from the dipole antenna to the patch antenna and/or if the UE 120 is not capable of simultaneous communication using both the dipole antenna and the patch antenna. Thus, in some aspects, the UE 120 may measure a subset of the CSI-RS for CSF resources indicated in the CSI-RS for CSF configuration. For example, the UE 120 may measure every $N^{th}$ resource.

As shown by reference number 525, the UE 120 may determine a first spectral efficiency (SPEF) parameter associated with the dipole antenna and a second SPEF parameter associated with the patch antenna. As shown, the UE 120 may determine the first SPEF parameter (shown as SPEF 1) based at least in part on a modulation and coding scheme (MCS) and/or a rank (e.g., indicated by a rank indicator (RI)) being used by the UE 120 to communicate using the dipole antenna. As further shown, the UE 120 may determine the second SPEF parameter (shown as SPEF 2) based at least in part on measuring the CSI-RS for CSF on multiple ports (e.g., two ports) using the patch antenna.

In some aspects, the spectral efficiency parameter may indicate a measure of use of a spectrum or bandwidth unit relating to the amount of data that can be transmitted over a given bandwidth in a communication system per time unit. Spectral efficiency may be expressed using a measure of bits per second per hertz or bits/s/Hz. In other words, spectral efficiency may be defined as the net data rate (in bits per second) divided by the bandwidth in hertz. A net data rate and/or a symbol rate may relate to a raw data rate, which may be based at least in part on usable payload and overhead. For example, a raw data rate may be equal to payload plus overhead. A net data rate may be equal to the raw data rate minus overhead. Spectral efficiency may be equal to the net data rate or a raw data rate (e.g., in bits per second) per channel bandwidth (e.g., in hertz). In some aspects, the spectral efficiency parameter may be determined by comparing PMI and/or RI hypotheses per beam and also across beams. In some aspects, the spectral efficiency parameter representing a maximum achievable spectral efficiency per channel (e.g., per physical downlink shared channel (PDSCH) and/or the like) per beam may be estimated using all possible (e.g., configured) PMI and/or RI combinations for communications on the channel.

The UE 120 may compare the first SPEF parameter and the second SPEF parameter. The UE 120 may select either the dipole antenna or the patch antenna for subsequent communications with the base station 110 based at least in part on the comparison. For example, as shown by reference number 530, if the first SPEF parameter is better than the second SPEF parameter (e.g., indicating a higher spectral efficiency than the second SPEF parameter), then the UE 120 may continue communicating with the base station 110 using the dipole antenna. In this case, the UE 120 may continue to measure CSI-RS for CSF using the patch antenna (e.g., occasionally, periodically, and/or the like). However, in some aspects, the UE 120 may decrease a frequency with which such measurements are performed (e.g., by increasing a periodicity for CSI-RS for CSF measurements, by increasing a value of N if the UE 120 measures every $N^{th}$ CSI-RS for CSF resource, and/or the like).

As shown by reference number 535, if the second SPEF parameter is better than the first SPEF parameter (e.g., indicating a higher spectral efficiency than the first SPEF parameter), then the UE 120 may use the patch antenna for subsequent communications with the base station 110 (e.g., communications that occur after a determination of which SPEF parameter indicates higher spectral efficiency). In this case, the UE 120 may transmit a CSI report based at least in part on one or more parameters determined by using the patch antenna to measure the CSI-RS for CSF. For example, the UE 120 may determine one or more of channel quality information (CQI), a precoding matrix indicator (PMI), a rank indication (RI), and/or the like based at least in part on using the patch antenna to measure the CSI-RS for CSF (e.g., on multiple ports). In some aspects, the UE 120 may report the CQI, PMI, and/or RI in the next occurrence of a CSI report after determining to switch from the dipole antenna to the patch antenna. For example, the UE 120 may report a rank of two (or higher) after switching to the patch antenna, whereas the UE 120 may have reported a rank of one when communicating using the dipole antenna. As a result, the base station 110 may modify subsequent transmissions (e.g., to transmit using multiple MIMO layers) to improve performance (e.g., throughput, reliability, and/or the like).

Thus, as described herein, the UE 120 may perform a beam management procedure using CSI-RS for channel state feedback rather than CSI-RS for beam management despite being configured with CSI-RS for beam management. Typically, the UE 120 and/or base station 110 would use CSI-RS for beam management for beam selection, performing beam management procedures, and/or the like. Furthermore, the UE 120 and/or base station 110 would typically use CSI-RS for CSF for determining the right MCS and/or CQI values for a channel. However, in the case of multi-layer (e.g., MIMO) communications, the CSI-RS for CSF may provide a more accurate representation of channel conditions due to using multiple ports. As a result, the UE 120 may improve performance via selection of a better antenna (e.g., associated with a better beam).

As indicated above, FIG. 5 is provided as an example. Other examples may differ from what is described with regard to FIG. 5.

FIG. 6 is a diagram illustrating an example process 600 performed, for example, by a UE, in accordance with various aspects of the present disclosure. Example process 600 is an example where the UE (e.g., UE 120 and/or the like) performs operations associated with antenna and beam selection using CSI for CSF rather than CSI for beam management.

As shown in FIG. 6, in some aspects, process 600 may include selecting a first type of antenna for communication with a base station based at least in part on a beam management procedure that uses an RSRP parameter determined using a downlink reference signal associated with a single antenna port (block 610). For example, the UE (e.g., using receive processor 258, controller/processor 280, memory 282, and/or the like) may select a first type of antenna for communication with a base station based at least in part on a beam management procedure that uses an RSRP parameter determined using a downlink reference signal associated with a single antenna port, as described above.

As further shown in FIG. 6, in some aspects, process 600 may include measuring a CSI-RS resource for CSF, associated with multiple antenna ports, using a second type of antenna and after selecting the first type of antenna (block 620). For example, the UE (e.g., using receive processor 258, controller/processor 280, memory 282, and/or the like) may measure a CSI-RS resource for CSF, associated with multiple antenna ports, using a second type of antenna and after selecting the first type of antenna, as described above.

As further shown in FIG. 6, in some aspects, process 600 may include comparing a first spectral efficiency parameter associated with communicating using the first type of antenna and a second spectral efficiency parameter determined based at least in part on measuring the CSI-RS resource for CSF using the second type of antenna (block 630). For example, the UE (e.g., using receive processor 258, controller/processor 280, memory 282, and/or the like) may compare a first spectral efficiency parameter associated with communicating using the first type of antenna and a second spectral efficiency parameter determined based at least in part on measuring the CSI-RS resource for CSF using the second type of antenna, as described above. In some aspects, the UE may determine a second spectral efficiency parameter based at least in part on measuring a CSI-RS resource for CSF, associated with multiple antenna ports, using a second type of antenna and after selecting the first type of antenna. The UE may compare a first spectral efficiency parameter associated with communicating using the first type of antenna and a the second spectral efficiency parameter.

As further shown in FIG. 6, in some aspects, process 600 may include selecting one of the first type of antenna or the second type of antenna for subsequent communication with the base station based at least in part on comparing the first spectral efficiency parameter and the second spectral efficiency parameter (block 640). For example, the UE (e.g., using receive processor 258, controller/processor 280, memory 282, and/or the like) may select one of the first type of antenna or the second type of antenna for subsequent communication with the base station based at least in part on comparing the first spectral efficiency parameter and the second spectral efficiency parameter, as described above.

Process 600 may include additional aspects, such as any single aspect or any combination of aspects described below and/or in connection with one or more other processes described elsewhere herein.

In a first aspect, process 600 includes receiving a configuration that indicates a CSI-RS resource for beam management, that is associated with a single antenna port, and the CSI-RS resource for CSF that is associated with multiple antenna ports, wherein the second spectral efficiency parameter is determined based at least in part on measuring the CSI-RS resource for CSF rather than measuring the CSI-RS resource for beam management.

In a second aspect, alone or in combination with the first aspect, the first spectral efficiency parameter associated with communicating using the first type of antenna is determined based at least in part on at least one of a rank being used by the UE to communicate using the first type of antenna, a modulation and coding scheme being used by the UE to communicate using the first type of antenna, or a combination thereof.

In a third aspect, alone or in combination with one or more of the first and second aspects, the second type of antenna is selected for subsequent communication with the base station, and process 600 includes reporting channel quality information based at least in part on measuring the CSI-RS resource for CSF using the second type of antenna.

In a fourth aspect, alone or in combination with one or more of the first through third aspects, the first type of antenna is selected for communication with a base station instead of the second type of antenna based at least in part on the beam management procedure that uses the RSRP parameter.

In a fifth aspect, alone or in combination with one or more of the first through fourth aspects, process 600 includes reporting a rank of one after selecting the first type of antenna based at least in part on the beam management procedure that uses the RSRP parameter; and reporting a rank of two or higher after selecting the second type of antenna based at least in part on comparing the first spectral efficiency parameter and the second spectral efficiency parameter.

In a sixth aspect, alone or in combination with one or more of the first through fifth aspects, the first type of antenna is a dipole antenna and the second type of antenna is a patch antenna.

In a seventh aspect, alone or in combination with one or more of the first through sixth aspects, the CSI-RS resource for CSF is measured periodically using the second type of antenna and after selecting the first type of antenna.

In an eighth aspect, alone or in combination with one or more of the first through seventh aspects, the downlink reference signal associated with the single antenna port is a synchronization signal block or a CSI-RS for beam management.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

As used herein, the term "component" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   selecting a first type of antenna for communication with a base station based at least in part on a beam management procedure that uses a reference signal received power (RSRP) parameter determined using a downlink reference signal associated with a single antenna port;
   determining a second spectral efficiency parameter based at least in part on measuring a channel state information reference signal (CSI-RS) resource for channel state feedback (CSF), associated with multiple antenna ports, using a second type of antenna and after selecting the first type of antenna,
   the first type of antenna including a first pattern of one or more first antenna elements, and
   the second type of antenna including a second pattern of one or more second antenna elements,
   the one or more first antenna elements being a different type of antenna element than the one or more second antenna elements;
   comparing a first spectral efficiency parameter associated with communicating using the first type of antenna and the second spectral efficiency parameter; and
   selecting one of the first type of antenna or the second type of antenna for subsequent communication with the base station based at least in part on comparing the first spectral efficiency parameter and the second spectral efficiency parameter.

2. The method of claim 1, further comprising:
   receiving a configuration that indicates a CSI-RS resource for beam management, that is associated with a single antenna port, and the CSI-RS resource for CSF that is associated with multiple antenna ports; and
   wherein the second spectral efficiency parameter is determined based at least in part on measuring the CSI-RS resource for CSF.

3. The method of claim 1, wherein the first spectral efficiency parameter associated with communicating using the first type of antenna is determined based at least in part on at least one of a rank being used by the UE to communicate using the first type of antenna, a modulation and coding scheme being used by the UE to communicate using the first type of antenna, or a combination thereof.

4. The method of claim 1, wherein the second type of antenna is selected for subsequent communication with the base station; and
   wherein the method further comprises reporting channel quality information based at least in part on measuring the CSI-RS resource for CSF using the second type of antenna.

5. The method of claim 1, wherein the first type of antenna is selected for communication with a base station instead of the second type of antenna based at least in part on the beam management procedure that uses the RSRP parameter.

6. The method of claim 1, further comprising:
   reporting a rank of one after selecting the first type of antenna based at least in part on the beam management procedure that uses the RSRP parameter; and
   reporting a rank of two or higher after selecting the second type of antenna based at least in part on comparing the first spectral efficiency parameter and the second spectral efficiency parameter.

7. The method of claim 1, wherein the first type of antenna is a dipole antenna and the second type of antenna is a patch antenna.

8. The method of claim 1, wherein the CSI-RS resource for CSF is measured periodically using the second type of antenna and after selecting the first type of antenna.

9. The method of claim 1, wherein the downlink reference signal associated with the single antenna port is a synchronization signal block or a CSI-RS for beam management.

10. The method of claim 1, wherein at least one of:
    the first pattern of the one or more first antenna elements has a different spacing than the second pattern of the one or more second antenna elements,
    the first type of antenna has a different polarization characteristic than the second type of antenna, or
    the first type of antenna has a different radiation pattern than the second type of antenna.

11. A user equipment (UE) for wireless communication, comprising:
    a memory; and
    one or more processors operatively coupled to the memory, the memory and the one or more processors configured to:
    select a first type of antenna for communication with a base station based at least in part on a beam management procedure that uses a reference signal received power (RSRP) parameter determined using a downlink reference signal associated with a single antenna port;

determine a second spectral efficiency parameter based at least in part on measuring a channel state information reference signal (CSI-RS) resource for channel state feedback (CSF), associated with multiple antenna ports, using a second type of antenna and after selecting the first type of antenna,
the first type of antenna including a first pattern of one or more first antenna elements, and
the second type of antenna including a second pattern of one or more second antenna elements,
the one or more first antenna elements being a different type of antenna element than the one or more second antenna elements;
compare a first spectral efficiency parameter associated with communicating using the first type of antenna and the second spectral efficiency parameter; and
select one of the first type of antenna or the second type of antenna for subsequent communication with the base station based at least in part on comparing the first spectral efficiency parameter and the second spectral efficiency parameter.

12. The UE of claim 11, wherein the one or more processors are further configured to:
receive a configuration that indicates a CSI-RS resource for beam management, that is associated with a single antenna port, and the CSI-RS resource for CSF that is associated with multiple antenna ports; and
wherein the second spectral efficiency parameter is determined based at least in part on measuring the CSI-RS resource for CSF rather than measuring the CSI-RS resource for beam management.

13. The UE of claim 11, wherein the first spectral efficiency parameter associated with communicating using the first type of antenna is determined based at least in part on at least one of a rank being used by the UE to communicate using the first type of antenna, a modulation and coding scheme being used by the UE to communicate using the first type of antenna, or a combination thereof.

14. The UE of claim 11, wherein the second type of antenna is selected for subsequent communication with the base station; and
wherein the one or more processors are further configured to report channel quality information based at least in part on measuring the CSI-RS resource for CSF using the second type of antenna.

15. The UE of claim 11, wherein the one or more processors are further configured to:
report a rank of one after selecting the first type of antenna based at least in part on the beam management procedure that uses the RSRP parameter; and
report a rank of two or higher after selecting the second type of antenna based at least in part on comparing the first spectral efficiency parameter and the second spectral efficiency parameter.

16. The UE of claim 11, wherein the first type of antenna is a dipole antenna and the second type of antenna is a patch antenna.

17. The UE of claim 11, wherein the CSI-RS resource for CSF is measured periodically using the second type of antenna and after selecting the first type of antenna.

18. A non-transitory computer-readable medium storing one or more instructions for wireless communication, the one or more instructions comprising:
one or more instructions that, when executed by one or more processors of a user equipment (UE), cause the one or more processors to:
select a first type of antenna for communication with a base station based at least in part on a beam management procedure that uses a reference signal received power (RSRP) parameter determined using a downlink reference signal associated with a single antenna port;
determine a second spectral efficiency parameter based at least in part on measuring a channel state information reference signal (CSI-RS) resource for channel state feedback (CSF), associated with multiple antenna ports, using a second type of antenna and after selecting the first type of antenna,
the first type of antenna including a first pattern of one or more first antenna elements, and
the second type of antenna including a second pattern of one or more second antenna elements,
the one or more first antenna elements being a different type of antenna element than the one or more second antenna elements;
compare a first spectral efficiency parameter associated with communicating using the first type of antenna and the second spectral efficiency parameter; and
select one of the first type of antenna or the second type of antenna for subsequent communication with the base station based at least in part on comparing the first spectral efficiency parameter and the second spectral efficiency parameter.

19. The non-transitory computer-readable medium of claim 18, wherein the one or more instructions, when executed by the one or more processors, further cause the one or more processors to:
receive a configuration that indicates a CSI-RS resource for beam management, that is associated with a single antenna port, and the CSI-RS resource for CSF that is associated with multiple antenna ports; and
wherein the second spectral efficiency parameter is determined based at least in part on measuring the CSI-RS resource for CSF rather than measuring the CSI-RS resource for beam management.

20. The non-transitory computer-readable medium of claim 18, wherein the first spectral efficiency parameter associated with communicating using the first type of antenna is determined based at least in part on at least one of a rank being used by the UE to communicate using the first type of antenna, a modulation and coding scheme being used by the UE to communicate using the first type of antenna, or a combination thereof.

21. The non-transitory computer-readable medium of claim 18, wherein the second type of antenna is selected for subsequent communication with the base station; and
wherein the one or more instructions, when executed by the one or more processors, further cause the one or more processors to report channel quality information based at least in part on measuring the CSI-RS resource for CSF using the second type of antenna.

22. The non-transitory computer-readable medium of claim 18, wherein the one or more instructions, when executed by the one or more processors, further cause the one or more processors to:
report a rank of one after selecting the first type of antenna based at least in part on the beam management procedure that uses the RSRP parameter; and
report a rank of two or higher after selecting the second type of antenna based at least in part on comparing the first spectral efficiency parameter and the second spectral efficiency parameter.

23. The non-transitory computer-readable medium of claim 18, wherein the first type of antenna is a dipole antenna and the second type of antenna is a patch antenna.

24. The non-transitory computer-readable medium of claim 18, wherein the CSI-RS resource for CSF is measured periodically using the second type of antenna and after selecting the first type of antenna.

25. An apparatus for wireless communication, comprising:
   means for selecting a first type of antenna for communication with a base station based at least in part on a beam management procedure that uses a reference signal received power (RSRP) parameter determined using a downlink reference signal associated with a single antenna port;
   means for determining a second spectral efficiency parameter based at least in part on measuring a channel state information reference signal (CSI-RS) resource for channel state feedback (CSF), associated with multiple antenna ports, using a second type of antenna and after selecting the first type of antenna,
      the first type of antenna including a first pattern of one or more first antenna elements, and
      the second type of antenna including a second pattern of one or more second antenna elements,
         the one or more first antenna elements being a different type of antenna element than the one or more second antenna elements;
   means for comparing a first spectral efficiency parameter associated with communicating using the first type of antenna and the second spectral efficiency parameter; and
   means for selecting one of the first type of antenna or the second type of antenna for subsequent communication with the base station based at least in part on comparing the first spectral efficiency parameter and the second spectral efficiency parameter.

26. The apparatus of claim 25, further comprising:
   means for receiving a configuration that indicates a CSI-RS resource for beam management, that is associated with a single antenna port, and the CSI-RS resource for CSF that is associated with multiple antenna ports; and
   wherein the second spectral efficiency parameter is determined based at least in part on measuring the CSI-RS resource for CSF rather than measuring the CSI-RS resource for beam management.

27. The apparatus of claim 25, wherein the first spectral efficiency parameter associated with communicating using the first type of antenna is determined based at least in part on at least one of a rank being used by the apparatus to communicate using the first type of antenna, a modulation and coding scheme being used by the apparatus to communicate using the first type of antenna, or a combination thereof.

28. The apparatus of claim 25, wherein the second type of antenna is selected for subsequent communication with the base station; and
   wherein the apparatus further comprises means for reporting channel quality information based at least in part on measuring the CSI-RS resource for CSF using the second type of antenna.

29. The apparatus of claim 25, further comprising:
   means for reporting a rank of one after selecting the first type of antenna based at least in part on the beam management procedure that uses the RSRP parameter; and
   means for reporting a rank of two or higher after selecting the second type of antenna based at least in part on comparing the first spectral efficiency parameter and the second spectral efficiency parameter.

30. The apparatus of claim 25, wherein the first type of antenna is a dipole antenna and the second type of antenna is a patch antenna.

31. The apparatus of claim 25, wherein the CSI-RS resource for CSF is measured periodically using the second type of antenna and after selecting the first type of antenna.

* * * * *